(12) United States Patent
Miyata et al.

(10) Patent No.: US 10,618,432 B2
(45) Date of Patent: Apr. 14, 2020

(54) POWER SUPPLY RAIL

(71) Applicant: Mik Electronic Corporation, Tokyo (JP)

(72) Inventors: Muneyoshi Miyata, Tokyo (JP); Hideaki Morishita, Tokyo (JP)

(73) Assignee: Mik Electronic Corporation, Tokyo (JP)

( * ) Notice: Subject to any disclaimer, the term of this patent is extended or adjusted under 35 U.S.C. 154(b) by 41 days.

(21) Appl. No.: 16/014,135

(22) Filed: Jun. 21, 2018

(65) Prior Publication Data
US 2018/0370389 A1    Dec. 27, 2018

(30) Foreign Application Priority Data

Jun. 21, 2017 (JP) ................................ 2017-120973

(51) Int. Cl.
| | | |
|---|---|---|
| *B60N 2/07* | (2006.01) | |
| *B60N 2/02* | (2006.01) | |
| *H02G 11/00* | (2006.01) | |
| *B60R 16/02* | (2006.01) | |

(52) U.S. Cl.
CPC ......... *B60N 2/0732* (2013.01); *B60N 2/0224* (2013.01); *B60N 2/0232* (2013.01); *B60R 16/0207* (2013.01); *H02G 11/00* (2013.01); *B60N 2002/0264* (2013.01)

(58) Field of Classification Search
CPC .. B60N 2/0732; B60N 2/0232; B60N 2/0207; B60N 2/0224; H02G 11/00; B60R 16/0207; B60R 16/0215
See application file for complete search history.

(56) References Cited

U.S. PATENT DOCUMENTS

| | | | | |
|---|---|---|---|---|
| 8,950,714 B2* | 2/2015 | Ikeda | ................... | H02G 11/006 138/106 |
| 10,305,270 B2* | 5/2019 | Kuboki | ............... | B60R 16/0215 |
| 10,377,327 B1* | 8/2019 | Katoh | .................. | H02G 3/0462 |
| 2005/0035622 A1* | 2/2005 | Tsubaki | ............... | B60N 2/0224 296/65.13 |
| 2006/0030174 A1* | 2/2006 | Tsubaki | ................. | H02G 11/00 439/76.2 |
| 2007/0085375 A1* | 4/2007 | Terada | ..................... | B60N 2/06 296/155 |
| 2011/0048761 A1* | 3/2011 | Terada | ................ | B60R 16/0215 174/68.3 |

FOREIGN PATENT DOCUMENTS

JP     2005-059745 A     3/2005

* cited by examiner

*Primary Examiner* — Pete T Lee
*Assistant Examiner* — Amol H Patel
(74) *Attorney, Agent, or Firm* — Muncy, Geissler, Olds & Lowe, P.C.

(57) ABSTRACT

[Object] Provided is a power supply rail capable of continuing to stably supply electric power from a power supply of a vehicle to a slide seat.
[Solving Means] A power supply rail 1 according to the present invention is configured by including a long tubular case 8, a flexible flat cable 11 accommodated in a hollow portion 9 in the case 8, a fixed terminal 12 fixed to the case 8, a movable terminal 13 movable in a longitudinal direction of the case 8, an actuator 16 that accommodates the movable terminal 13 and moves along a slit 20 of the case 8, and a guide plate 17 that guides the movement of the flexible flat cable 11 while pressing the flexible flat cable 11 in accordance with the movement of the actuator 16.

5 Claims, 6 Drawing Sheets

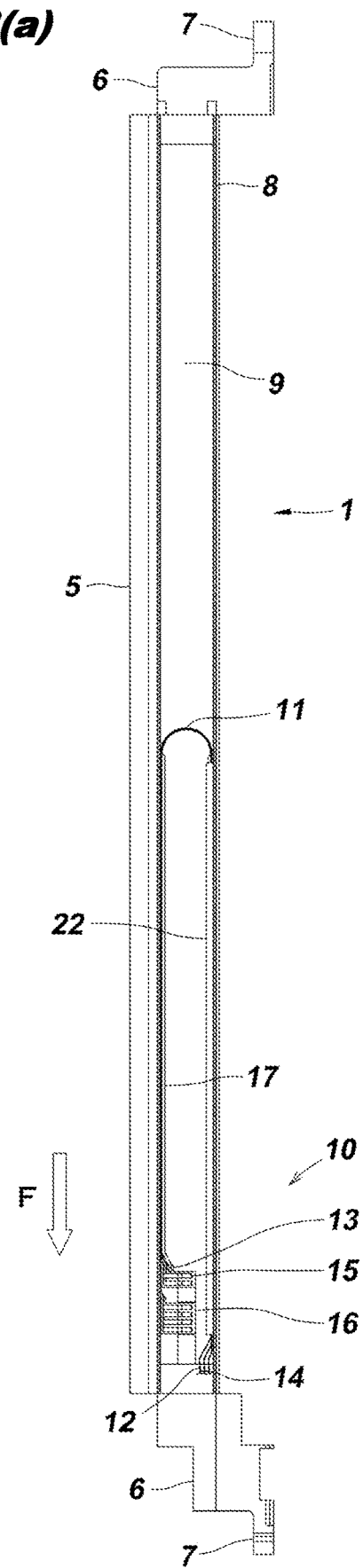
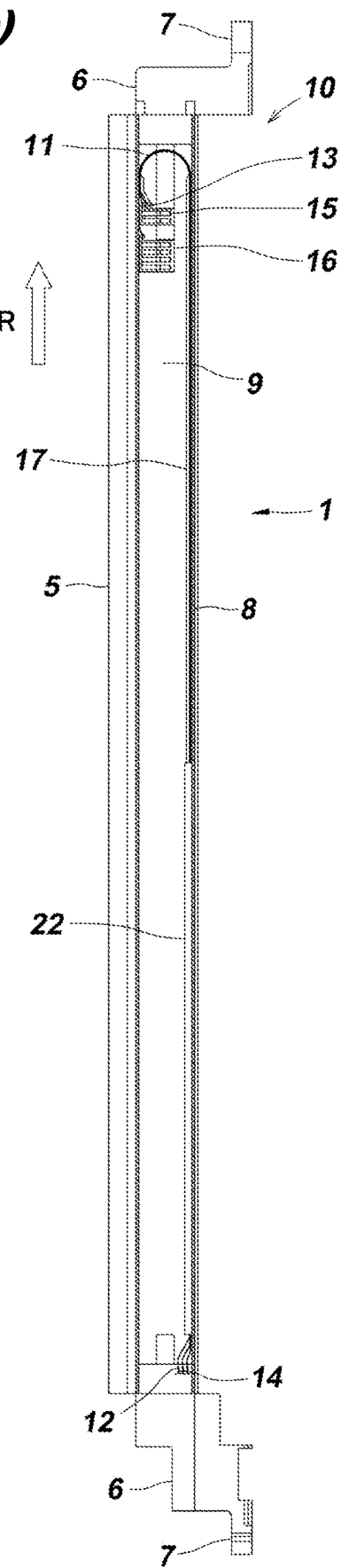
Fig. 8(a)
Fig. 8(b)

POWER SUPPLY RAIL

TECHNICAL FIELD

The present invention relates to a power supply rail for supplying electric power to a slide seat mounted on a vehicle such as an automobile.

BACKGROUND ART

Conventionally, as a device of this type, for example, a power supply device for a slide seat described in Patent Document 1 is known. This power supply device is configured by including a case having a harness accommodation portion, a movable body that advances or retreats along the case, and a wire harness that bends within the harness accommodation portion while one end portion of the wire harness being supported by the movable body and the other end portion of the wire harness being supported by the case. Further, the wire harness is distributed along the movable body to be connected to a circuit on the side of a slide seat, and a circuit on the side of a power supply of a vehicle is connected to a connector of the case. Thus, the movable body advances or retreats simultaneously with advancing or retreating of the slide seat, and electric power is supplied from the circuit on the side of the power supply of the vehicle to the circuit on the side of the slide seat via the wire harness.

CITATION LIST

Patent Document

Patent Document 1: JP 2005-59745 A

SUMMARY OF THE INVENTION

Problem to be Solved by the Invention

According to a conventional power supply device as described above, since the wire harness is accommodated in the harness accommodation portion of the case while the wire harness being bent. Therefore, there is a concern that, when the movable body advances or retreats in accordance with the advancing or retreating of the slide seat, the wire harness may be caught in the case, thus hindering movement of the movable body or the wire harness may be twisted or pulled, thus causing a malfunction. For this reason, there has been a problem that supply of electric power from the power source of the vehicle to the slide seat becomes unstable.

Therefore, the present invention has been made to solve such problems, and it is an object of the present invention to provide a power supply rail capable of continuing to stably supply electric power from a power supply of a vehicle to a slide seat.

Means for Solving Problem

In order to achieve the above object, a power supply rail according to the present invention is configured by including a long tubular case, a flexible flat cable accommodated in a hollow portion in the case, a fixed terminal provided at one end of the flexible flat cable and fixed to the case, a movable terminal provided at the other end of the flexible flat cable and movable in a longitudinal direction of the case, an actuator that accommodates the movable terminal and moves along a slit of the case, and a guide plate that guides the movement of the flexible flat cable while pressing the flexible flat cable in accordance with the movement of the actuator.

Further, in the power supply rail configured as described above, it is preferable that a cross-sectional shape of the guide plate is formed in a curved shape that protrudes toward the flexible flat cable.

Effect of the Invention

According to the present invention, it is possible to electrically connect the slide seat and the power supply of the vehicle via the power supply rail. In particular, since there are no complicated wires or the like such as a wire harness in the hollow portion of the case, there is an effect that it is possible to save troublesome work for distributing the wire harness.

In addition, when the slide seat advances and retreats, a hindrance to the movement of the slide seat caused by the electric wires or the like being caught in the hollow portion or malfunction caused by the electric wires or the like being twisted or pulled does not occur. In other words, since the actuator moves in accordance with the movement of the slide seat and the guide plate guides the movement of the flexible flat cable while pressing the flexible flat cable in accordance with the movement of the actuator, the flexible flat cable does not bend or corrugate and deflect, so that the flexible flat cable can smoothly expand and contract within the hollow portion. Therefore, there is an effect that it is possible to continue to stably supply electric power from the power supply of the vehicle to the slide seat.

BRIEF DESCRIPTION OF DRAWINGS

FIG. 8(a) is a diagram illustrating a state in which an actuator is in a forward position, and FIG. 8(b) is a diagram illustrating a state in which the actuator is in a rear position, in the power supply rail of the present invention.

MODE(S) FOR CARRYING OUT THE INVENTION

Hereinafter, embodiments for carrying out the present invention will be described with reference to the drawings.

Figure 1:
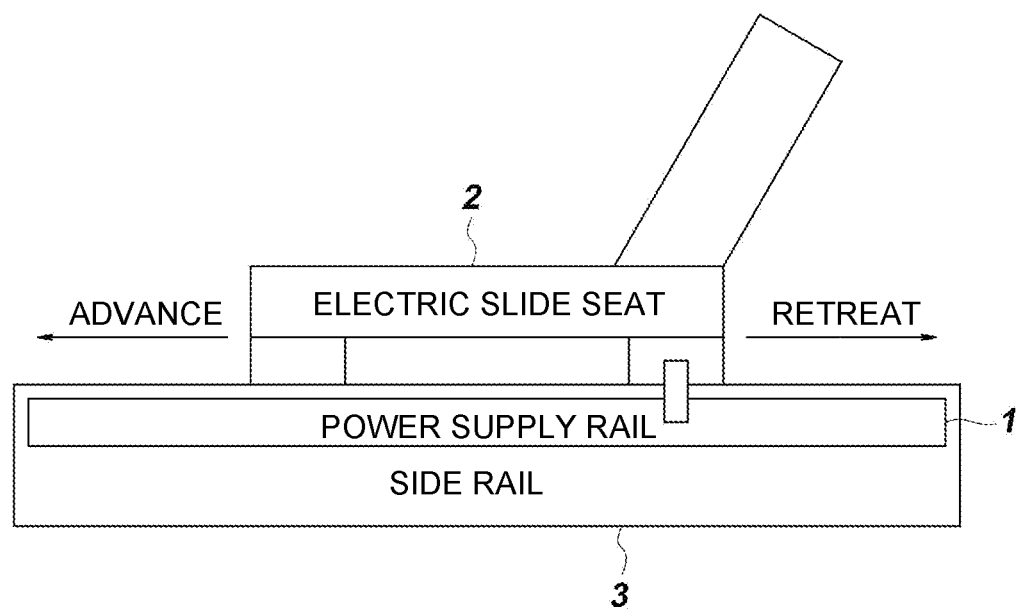
FIG. 1 is a front view illustrating the structure of a periphery of a slide seat of a motor vehicle to which a power supply rail according to the present invention is mounted.

As illustrated in FIG. 1, a power supply rail 1 of the present embodiment is for supplying electric power from a power source of a vehicle such as an automobile to a slide seat 2 mounted on the vehicle. The power supply rail 1 is attached to and integrated with a side surface of the side rail 3 so that electric power can be continuously supplied when the slide seat 2 reciprocates forward and backward along the side rails 3. The present invention can be applied to any one of an electric type and a non-electric type (manual type) of the slide seat 2.

Figure 2:
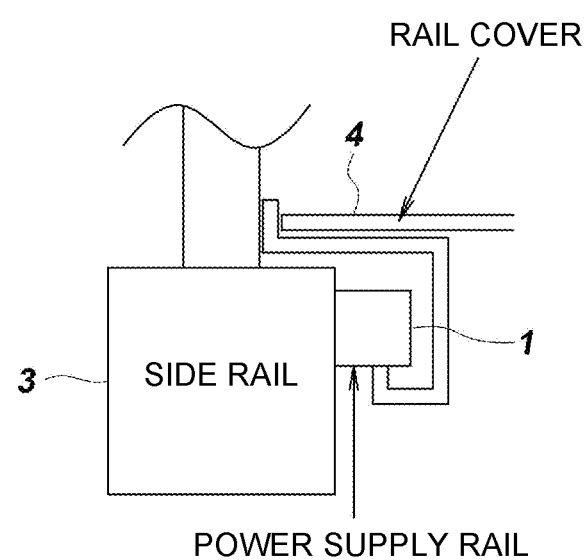
FIG. 2 is a side view illustrating the structure of the periphery of the slide seat of the motor vehicle to which the power supply rail of the present invention is mounted.

As illustrated in FIG. 2, a resin rail cover 4 is covered on the power supply rail 1, and the power supply rail 1 is protected so that foreign substance such as dust and sand inside the vehicle does not enter the power supply rail 1.

Figure 3:
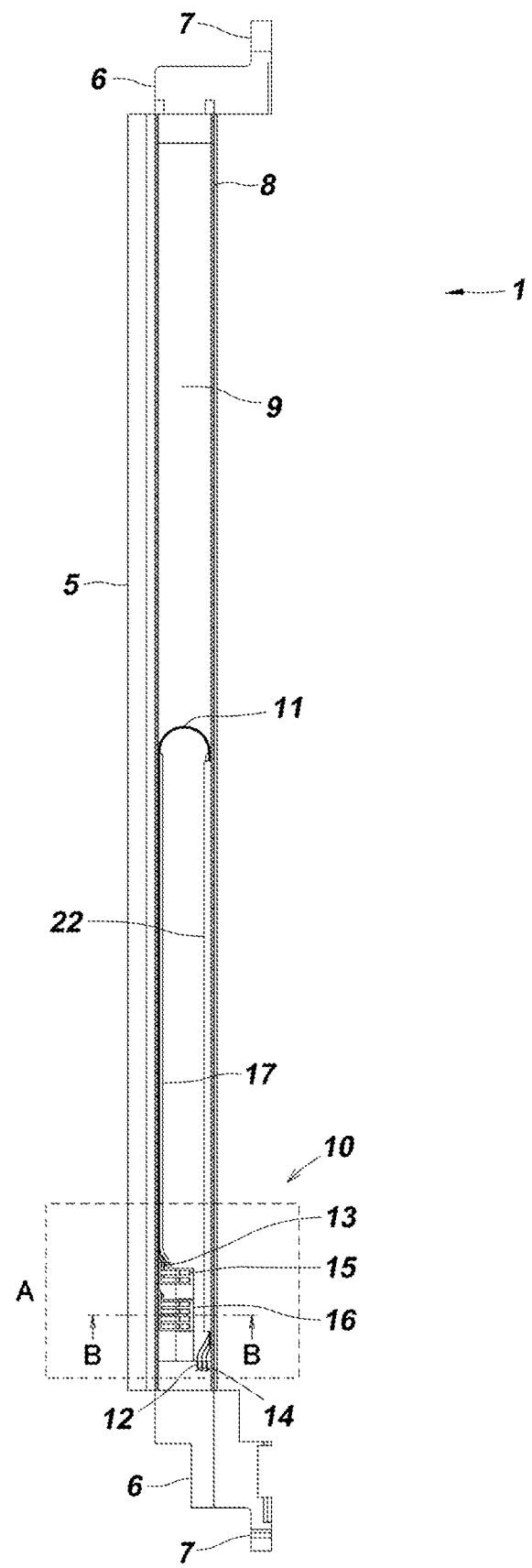
FIG. 3 is a view illustrating the entire structure of the power supply rail of the present invention.

As illustrated in FIG. 3, the power supply rail 1 of the present embodiment is accommodated in an aluminum mold 5 designed according to a moving distance of the slide seat 2 of a long slide type, and is entirely formed in an elongated shape. In addition, stopper caps 6 and 6 are fitted and fixed to both ends of the mold 5 so that parts inside the power supply rail 1 does not fall out, and the power supply rail 1 can be attached to the side surface of the side rail 3 by fixing attachment holes 7 and 7 provided in the cap 6 with screws.

The case 8 is made of a metal such as aluminum, and is formed into an elongated rectangular tube shape so as to be accommodated in the mold 5. A hollow portion 9 extending in a longitudinal direction of the case 8 is provided inside the case 8, and a movable mechanism 10 described below reciprocates in the hollow portion 9 along a longitudinal direction of the hollow portion 9.

Figure 4:
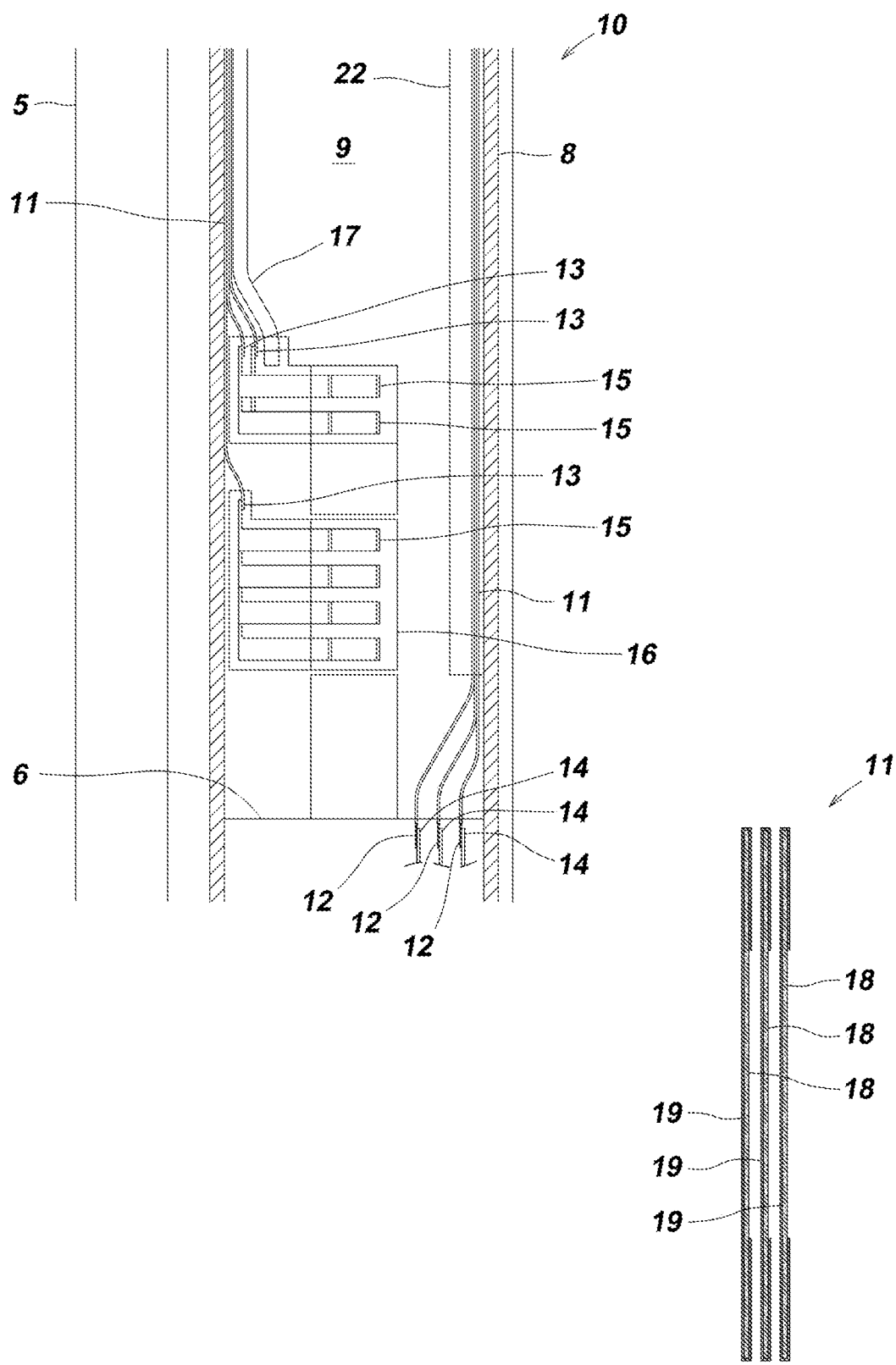
FIG. 4 is an enlarged cross-sectional view of a portion A in FIG. 3 and a detailed view of a flexible flat cable.

As illustrated in the enlarged view of FIG. 4, the movable mechanism 10 is configured by including components of a flexible flat cable 11, a fixed terminal 12, a movable terminal 13, bus bars 14 and 15, an actuator 16, and a guide plate 17.

Figure 5:
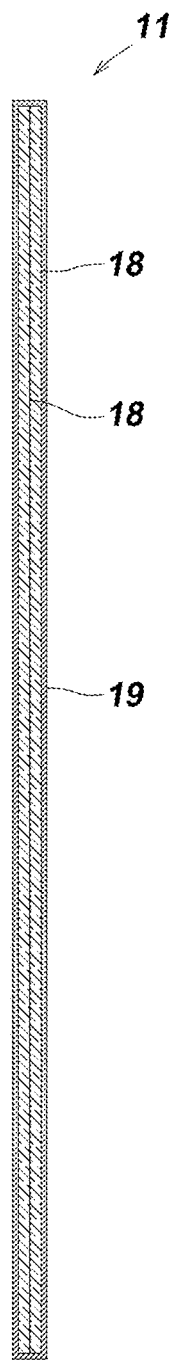
FIG. 5 is a cross-sectional view illustrating another configuration example of the flexible flat cable of FIG. 3.

The flexible flat cable 11 is formed in a long flat shape to include a thin plate (a copper plate in the present embodiment) 18 made of a conductor and a heat-resistant insulation tape (a polyimide tape in the present embodiment) 19 covering an outer surface of the thin plate 18, and is accommodated in the hollow portion 9 within the case 8. In the present embodiment, three flexible flat cables 11 are superimposed. The reason for this is to increase an electric capacity so that the thin plate 18 does not melt by heat when large current flows through the flexible flat cable 11. A larger number of flexible flat cables 11 may be superimposed as long as they are within a range in which they can be bent and deformed, and only one flexible flat cable 11 may be used as long as a sufficient electric capacity can be secured. Further, in order to alleviate heat due to large current, a flexible flat cable 11 may be used in which the thin plates 18 are superimposed as illustrated in FIG. 5.

At one end of the flexible flat cable 11, fixed terminals 12, 12, and 12 made of conductors are integrally provided on each of the thin plates 18, 18, and 18. The fixed terminals 12 are accommodated inside a cap 6 provided at a tip of the case 8, and bus bars (hereinafter, referred to as "fixed-side bus bars") 14, 14, and 14 made of copper plates are fixed by welding to the fixed terminals 12 respectively. The fixed-side bus bar 14 functions as a vehicle-side connector connected to wiring on the side of the vehicle.

On the other hand, at the other end of the flexible flat cable 11, movable terminals 13, 13, and 13 made of conductors are integrally provided on thin plates 18, 18, and 18, respectively. The movable terminals 13 are accommodated inside the actuator 16, and bus bars (hereinafter, referred to as "movable-side bus bars") 15, 15, and 15 made of copper plates are fixed by welding to the movable terminals respectively. The movable-side bus bar 15 functions as a seat-side connector connected to the wiring on the side of the seat.

Figure 6:
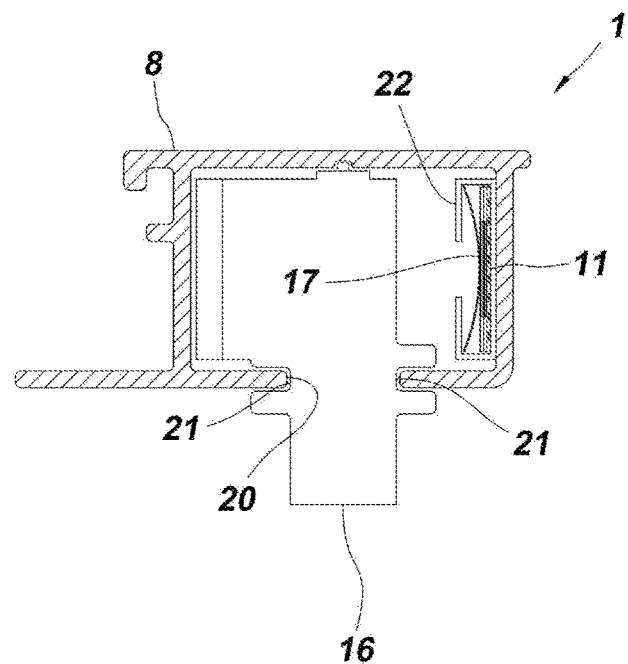
FIG. 6 is an enlarged cross-sectional view taken along line B-B of FIG. 3.

The actuator 16 is made of an insulator such as ABS resin and formed into a protruding cross-section shape having a width matching the hollow portion 9 as illustrated in FIG. 6, and the actuator 16 is provided with recessed portions 21 and 21 which are fitted to and supported by slits 20 of the case 8. Thus, the actuator 16 accommodating the movable-side bus bars 15 slides along the slit 20 and is configured to reciprocate in the longitudinal direction of the case 8.

By fixing the fixed-side bus bars 14 and the movable-side bus bars 15 to both ends of the flexible flat cable 11 in this manner, wiring work is simpler than that when connecting with lead wires, and an electrical resistance is small, enabling a large amount of current to flow. The method of fixing the fixed terminal 12 and the fixed-side bus bar 14 and fixing the movable terminal 13 and the movable-side bus bar 15 are not limited to welding, but other methods such as soldering, deposition, screwing, and caulking may be used.

Figure 7:
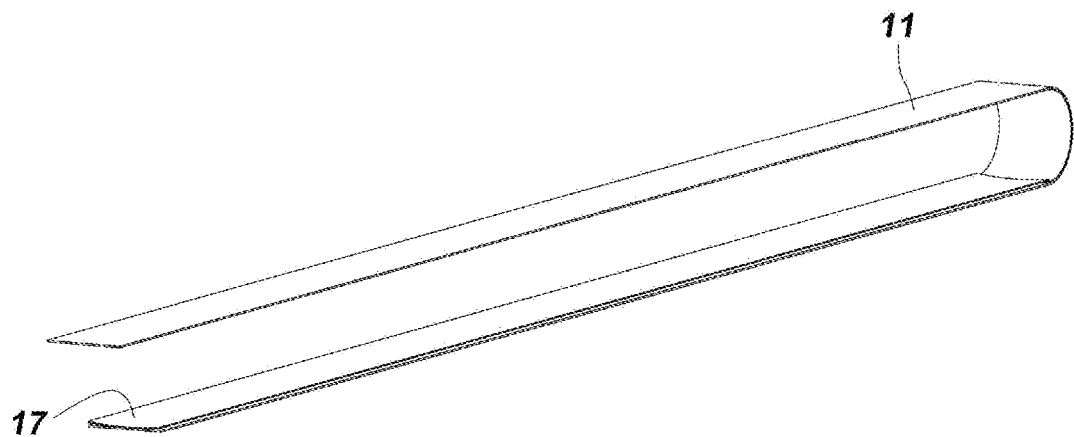
FIG. 7 is an enlarged perspective view of the flexible flat cable and a guide plate constituting the power supply rail of the present invention.

The guide plate 17 is made of a metal plate such as stainless steel and is formed into an elongated flat shape having the same width as that of the flexible flat cable 11 as illustrated in FIG. 7, and is formed in a curved shape (arc-shaped) in which a cross-sectional shape thereof is convex toward the flexible flat cable 11 by performing a process of drawing on the metal plate. As illustrated in FIG. 6, the guide plate 17 is accommodated in a rail 22 laid on the inner surface of the case 8, and a tip portion of the guide plate 17 is fixed to the actuator 16. The guide plate 17 is configured to guide the movement of the flexible flat cable 11 while pressing the flexible flat cable 11 with a spring force in accordance with movement of the actuator 16. The material of the guide plate 17 may be a metal material or a resin material other than stainless steel, and a sectional shape of the guide plate 17 is not limited to a curved shape as long as it can press the flexible flat cable 11 with a spring force.

The power supply rail 1 configured as described above is provided with the movable mechanism 10 inside the case 8, accommodated in the mold 5, and attached to the side surface of the side rail 3 via the caps 6 and 6 at both ends. At this time, since the actuator 16 accommodating the movable-side bus bars 15 protrudes to the outside of the case 8, a wiring of a motor circuit of the slide seat 2 may be connected to the movable-side bus bars 15 and a wiring of the power supply circuit on the vehicle side may be connected to the fixed-side bus bars 14. Thus, the power supply circuit of the vehicle and the motor circuit of the slide seat 2 can be electrically connected via the power supply rail 1.

That is, as illustrated in FIG. 8(a), when the actuator 16 of the power supply rail 1 is in a front position of the case 8, the fixed-side bus bars 14 and the movable-side bus bars 15 are connected via the flexible flat cable 11. Therefore, Electric power can be supplied from the power supply circuit of the vehicle to the motor circuit of the slide seat 2.

When the slide seat 2 illustrated in FIG. 1 retreats along the side rail 3, as illustrated in FIG. 8(b), the actuator 16 accommodating the movable-side bus bars 15 is pushed toward a rear of the case 8 and moves in a direction of an arrow R in the drawing in conjunction with the slide seat 2. At this time, in accordance with the movement of the actuator 16, the flexible flat cable 11 slides within the hollow portion 9 in the direction of the arrow R while being pressed by the spring force of the guide plate 17.

On the other hand, when the slide seat 2 illustrated in FIG. 1 advances along the side rail 3, the actuator 16 accommodating the movable-side bus bars 15 is pushed toward a front of the case 8 and moves in a direction of an arrow F direction in conjunction with the slide seat 2 as illustrated in FIG. 8(a). Here, the flexible flat cable 11 connected to the actuator 16 slides within the hollow portion 9 in the direction of the arrow F. At this time, the flexible flat cable 11 returns to an original position following a spring deformation of the guide plate 17. That is, since the flexible flat cable 11 is pressed by the guide plate 17 so that the movement of the flexible flat cable 11 by itself is restricted, the flexible flat cable 11 does not bend or corrugate and deflect during the movement and is smoothly moved in a state in which the flexible flat cable 11 always receives a constant tension applied thereto.

In this manner, when the slide seat 2 advances or retreats, the actuator 16 slides along the slit 20 of the case 8 in conjunction with the movement of the slide seat 2. Following the sliding of the actuator 16, the guide plate 17 and the flexible flat cable 11 expand and contract integrally. Further, since there are no complicated wires or the like such as the wire harness in the hollow portion 9, it is possible to save troublesome work for distributing the wire harness. Further, there is no concern that, when the slide seat 2 advances and retreats, the wire or the like is caught in the hollow portion 9, thus hindering the movement or the wire or the like is twisted or pulled, thus causing a malfunction. Moreover, since the flexible flat cable 11 is expanded and contracted following the spring deformation of the guide plate 17, the actuator 16 can move from a front end to a rear end along the longitudinal direction of the case 8 as illustrated in FIGS. 8(a) and 8(b), thereby securing a long moving distance.

Therefore, according to the power supply rail 1, the flexible flat cable 11 guided by the guide plate 17 following the movement of the slide seat 2 smoothly expands and contracts. Thus, it is possible to continue to stably supply electric power from the power supply circuit of the vehicle to the slide seat 2.

In the present embodiment, one movable mechanism 10 is provided in the hollow portion 9 to form one circuit, but the circuit configuration is not limited thereto. For example, a plurality of movable mechanisms 10 may be arranged in a height direction of the case 8 by overlapping the flexible flat cables 11 vertically or a plurality of movable mechanisms 10 may be arranged in a width direction of the case 8 by arranging a plurality of the flexible flat cables 11 with narrower widths in the left and right direction, thus forming a circuit configuration of two or more circuits. As a result, even when a fault occurs in the movable mechanism 10 of any one of the circuits, a fail-safe function for ensuring safety can be exerted by a normal operation of the movable mechanism 10 of the remaining circuit.

Further, in the present embodiment, electric power is supplied from the power supply circuit of the vehicle to the motor circuit of the slide seat 2 via the power supply rail 1, but the application is not limited thereto. For example, the power supply rail 1 can be used for applications such as a USB charger, a heater device of a seat, a seat belt reminder (alarm device) mounted on a vehicle, power supply and signal transmission to a rear seat, and the like.

EXPLANATIONS OF LETTERS OR NUMERALS

1 POWER SUPPLY RAIL
2 SLIDE SEAT
3 SIDE RAIL
4 RAIL COVER
5 MOLD
6 CAP
7 ATTACHMENT HOLES
8 CASE
9 HOLLOW PORTION
10 MOVABLE MECHANISM
11 FLEXIBLE FLAT CABLE
12 FIXED TERMINAL
13 MOVABLE TERMINAL
14 FIXED-SIDE BUS BAR
15 MOVABLE-SIDE BUS BAR
16 ACTUATOR
17 GUIDE PLATE
18 THIN PLATE
19 HEAT-RESISTANT INSULATION TAPE
20 SLIT
21 RECESSED PORTION
22 RAIL

The invention claimed is:

1. A power supply rail, comprising:
a long tubular case that extends in a longitudinal direction, having a hollow portion thereinside and a slit extending in the longitudinal direction such that the hollow portion connects to an outside of the case through the slit;
a flexible flat cable that is flexible and in a flat and on shape and is accommodated in the hollow portion in the case such that the flexible flat cable has two ends in the longitudinal direction;
a fixed terminal that is provided at the one end of the flexible flat cable and fixed to the case such that the fixed terminal is not movable;
a movable terminal that is provided at the other end of the flexible flat cable and is not fixed to the case such that the movable terminal is movable;
an actuator that accommodates the movable terminal and moves along the slit of the case such that the movable terminal moves in the longitudinal direction and the flexible flat cable is deformed in accordance with the movement of the actuator; and
a guide plate that is formed of an elastic material and is attached to one side of the flexible flat cable, the one side being opposite to the case, such that the guide plate is deformed in accordance with the movement of the actuator, and generates a resilience force due to the deformation of the guide plate, guides the movement of the flexible flat cable while pressing the flexible flat cable toward the case by the resilience force.

2. The power supply rail according to claim 1, wherein a cross-sectional shape of the guide plate, which is seem from a view in the longitudinal direction, is formed in a curved shape that protrudes toward the flexible flat cable.

3. The power supply rail according to claim 1, wherein the guide plate is in a flat and long shape, having two flat surfaces facing in opposite directions, and
one of the flat surface of the guide plate is entirely attached to the flexible flat cable, the flexible flat cable intervening between the guide plate and the case.

4. The power supply rail according to claim 1, wherein seen from a view in the longitudinal direction, the case is composed with two lateral walls arranged parallel in a lateral direction, and upper and lower walls arranged parallel in a vertical direction wherein each of the longitudinal, lateral and vertical directions is perpendicular to the other two directions, and
the fixed terminal is disposed on the lower wall, and
the movable terminal is disposed on the upper wall.

5. The power supply rail according to claim 4, wherein the slit is formed on one of the lateral walls, and
the actuator projects outside the case through the slit.

* * * * *